United States Patent
Riviere-Cazaux (10) Patent No.: US 7,574,682 B2
(45) Date of Patent: Aug. 11, 2009

(54) YIELD ANALYSIS AND IMPROVEMENT USING ELECTRICAL SENSITIVITY EXTRACTION

(75) Inventor: Lionel J. Riviere-Cazaux, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 155 days.

(21) Appl. No.: 11/680,012

(22) Filed: Feb. 28, 2007

(65) Prior Publication Data

US 2008/0209365 A1 Aug. 28, 2008

(51) Int. Cl.
G06F 17/50 (2006.01)
(52) U.S. Cl. .......................................... 716/4
(58) Field of Classification Search ........................ None
See application file for complete search history.

(56) References Cited

U.S. PATENT DOCUMENTS

| | | | |
|---|---|---|---|
| 6,598,210 B2 * | 7/2003 | Miwa | 716/4 |
| 6,738,954 B1 * | 5/2004 | Allen et al. | 716/4 |
| 6,748,571 B2 * | 6/2004 | Miwa | 716/4 |
| 7,302,653 B2 * | 11/2007 | Allen et al. | 716/4 |
| 7,310,788 B2 * | 12/2007 | Allen et al. | 716/4 |
| 7,313,777 B1 * | 12/2007 | Yang et al. | 716/10 |
| 7,346,470 B2 * | 3/2008 | Wisniewski et al. | 702/181 |
| 7,401,307 B2 * | 7/2008 | Foreman et al. | 716/6 |
| 2005/0071788 A1 | 3/2005 | Bickford et al. | 716/4 |
| 2005/0251771 A1 | 11/2005 | Robles | 716/5 |
| 2006/0053357 A1 * | 3/2006 | Rajski et al. | 714/742 |
| 2006/0066339 A1 * | 3/2006 | Rajski et al. | 324/765 |
| 2006/0190223 A1 | 8/2006 | Allen et al. | 703/2 |
| 2006/0277506 A1 | 12/2006 | Stine et al. | 716/4 |
| 2008/0148201 A1 * | 6/2008 | Lanzerotti et al. | 716/5 |

OTHER PUBLICATIONS

L. Riviere-Cazaux, "Use of Virtuoso Layout Migrate for Layout DFM Optimization," paper pp. 1-4 (CDNLlive! Silicon Valley 2006) http://www.cadence.com/cdnlive2006/na/files/3.8_paper.pdf.
S. Fitzpatrick et al.., "A Comparison of Critical Area Analysis Tools," 1998 IEEE/SEMI Advanced Semiconductor Manufacturing Conference and Workshop, Sep. 1998, pp. 31-33.
L. Riviere-Cazaux, "VLM for DFM," presentation slides 0-50 (CDNLlive! Silicon Valley 2006) (http://www.cadence.com/cdnlive2006/na/files/3.8$_{13}$ presentation.pdf).

* cited by examiner

*Primary Examiner*—Leigh Marie Garbowski
(74) *Attorney, Agent, or Firm*—Hamilton & Terrile, LLP; Michael Rocco Cannatti (57) ABSTRACT

A method and apparatus are described for determining an accurate yield prediction for an integrated circuit by combining conventional yield loss analysis (such as extracted from physical dimension information concerning a circuit layout) with extracted electrical sensitivity and/or functional sensitivity information for circuit elements (such as nets connecting logic blocks or other signal lines) to obtain an actual performance-based probability of failure (POF) for the overall circuit.

25 Claims, 5 Drawing Sheets

YIELD ANALYSIS AND IMPROVEMENT USING ELECTRICAL SENSITIVITY EXTRACTION

BACKGROUND OF THE INVENTION

1. Field of the Invention

The present invention is directed in general to the field of integrated circuit design. In one aspect, the present invention relates to a method of predicting manufacturing yield of a proposed integrated circuit design.

2. Description of the Related Art

As semiconductor device geometries continue to shrink and new process materials are adopted, it is increasingly difficult for semiconductor designers to estimate and realize device yields which traditionally have been limited primarily by defect density, but which is now impacted greatly by the interaction of process-related deviations with design elements. One approach for predicting yield, called the critical area analysis (CAA), uses a "critical area" of an integrated circuit layout as a measure to reflect the sensitivity of the layout to defects created occurring during the manufacturing process by particles, such as dust and other contaminants in materials and equipment. Defects can cause different types of circuit failures. For example, "short" defects are caused by extra material that is formed to connect or "short" different conducting regions, which can occur when shapes are printed larger than designed during the manufacturing process. As another example, "open" defects can occur when shapes are printed smaller than designed during the manufacturing process and when non-conductive particles or contaminants are formed in a conducting region to create an open circuit. While the CAA yield model is useful for predicting a yield value that can be used as a tool to control chip manufacturing costs, the CAA yield model has a built-in error in failing to properly account for the effects of "partial" open and short defects. For example, consider the case where a conductive line is only partially blocked by a contaminant/particle, but the conductive line is nonetheless sufficiently conductive. If the CAA yield model accounts for this partial open defect as a yield loss, then this results in a false yield loss prediction, which in turn can lead wasted efforts to correct false yield issues. Conversely, in the case where a conductive line is only partially blocked by a contaminant/particle so that the conductive line is insufficiently conductive, but the CAA yield model waives partial open defect (i.e., does not include it as a yield loss), then this results in a yield loss not being detected, which can result in the tape out of low yield products.

Accordingly, a need exists for an improved methodology and apparatus for accurately predicting manufacturing yield of a proposed integrated circuit design. There is also a need for improved integrated design processes and systems to overcome the problems in the art, such as outlined above. Further limitations and disadvantages of conventional methodologies and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

It will be appreciated that elements illustrated in the figures are illustrated in diagrammatic form for simplicity and clarity. Further, where considered appropriate, reference numerals have been repeated among the drawings to represent corresponding or analogous elements.

DETAILED DESCRIPTION

A method and apparatus are described for determining an accurate yield prediction for an integrated circuit by combining conventional yield loss analysis (such as extracted from physical dimension information concerning a circuit layout) with extracted electrical sensitivity and/or functional sensitivity information for circuit elements (such as nets connecting logic blocks or other signal lines) to obtain an actual performance-based probability of failure (POF) for the overall circuit. As a preliminary step, electrical and/or functional sensitivity information is extracted for one or more circuit elements. In various embodiments, electrical sensitivity information can be a function of the timing slack associated with the circuit element, where the timing slack is a measure of how quickly the circuit element must deliver a signal, or in other words, how much time there is between when a signal arrives at its destination and when the clock at the destination is triggered. Thus, a circuit element that requires a tight or short signal delivery has a first predetermined timing slack value (e.g., a relatively higher value), while a circuit element that does not require a tight or short signal delivery has a second predetermined timing slack value (e.g., a relatively lower value). In other embodiments, electrical sensitivity information can be a function of the power sag associated with the circuit element, where the power sag is a measure of how much power is provided to a circuit element. In a circuit area where there is a power sag, the lower voltage in that area will result in slower signal propagation. With the power sag measure, a circuit element that is located in a region of the integrated circuit chip that has a reduced power supply (e.g., a lower voltage or current) has a first predetermined power sag value (e.g., a relatively higher value), while a circuit element that is located in a region of the integrated circuit chip where the power supply is not reduced has a second predetermined power sag value (e.g., a relatively lower value). In still further embodiments, electrical sensitivity information can be a function of the device capability as compared to the device specification, such that a circuit element is assigned a first predetermined device capability value (e.g., a relatively higher value) if the device capability does not compare favorably with the device specification, but is assigned a second predetermined device capability value (e.g., a relatively lower value) if the device capability does compare favorably with the device specification. In yet other embodiments, functional sensitivity information can be assigned as a function of the redundancy of the circuit element's function, or as a function of the criticality of the circuit element's function for the overall system. Thus, a circuit element that is redundant with another circuit element may be assigned a first predetermined value (e.g., a relatively lower value) as compared to a second predetermined value (e.g., a relatively higher value) that is assigned to a circuit element for which there are no redundant circuits. Likewise, a circuit element that is not critical to the overall circuit's performance may be assigned a first predetermined value (e.g., a relatively lower value) as compared to a second predetermined value (e.g., a relatively higher value) that is assigned to a circuit element that is critical to the overall circuit's performance. The extracted information for a circuit element may be linked or tagged to the physical layout information corresponding to that circuit element, such as by using layer markers, special datatypes or a MetaInformation Database. The result is that the layout features and corresponding linked sensitivity information can be cross-analyzed to calculate a more accurate yield loss by applying the predetermined values for each circuit element to the conventional yield loss analysis to obtain an actual performance-based POF value for the overall circuit. The actual POF information can be sent to a manual or automated layout fixing tool in order to improve the yield of the product. Alternatively, the available electrical or functional sensitivity information can be used preventively to apply robust design rules on devices tagged as electrically or functionally sensitive.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
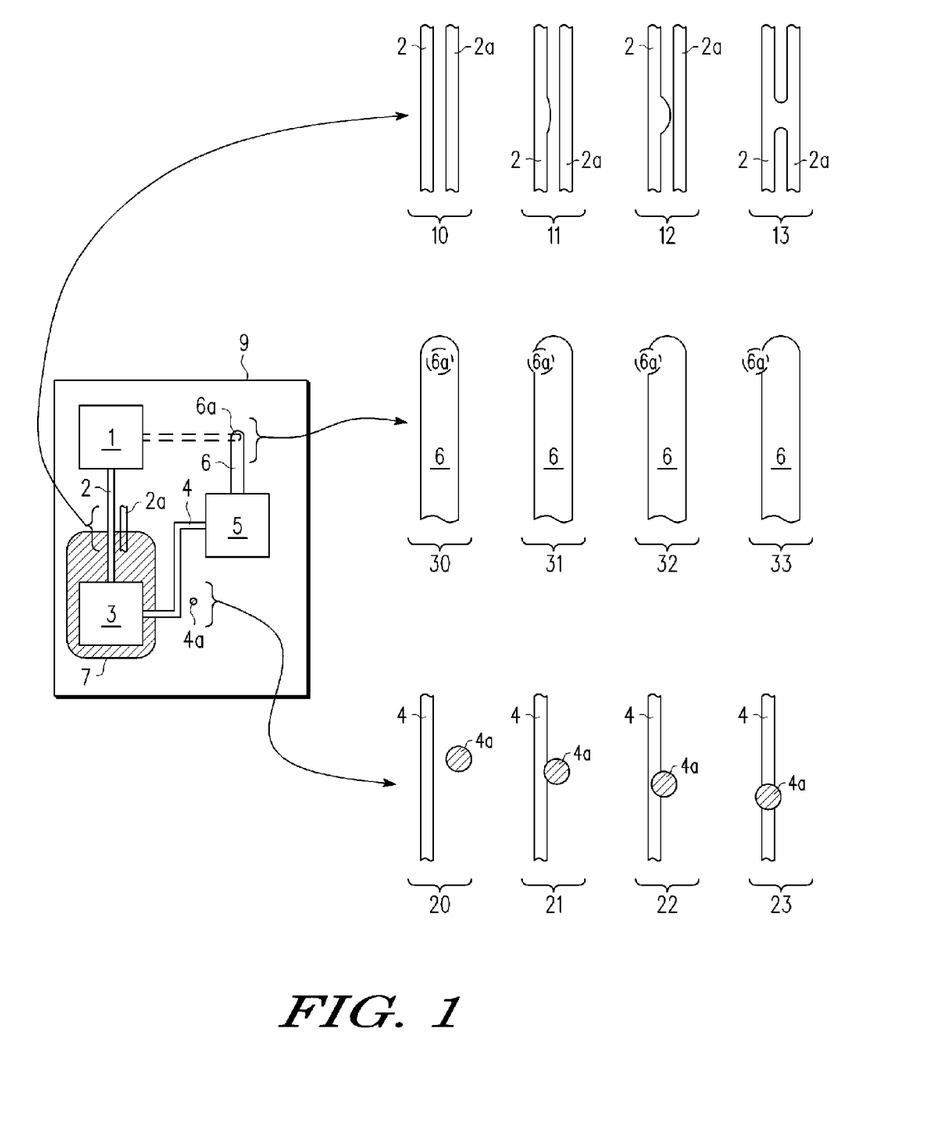
FIG. 1 is a simplified schematic representation of an integrated circuit in which circuit elements are arranged to illustrate how circuit defects on the circuit can affect the electrical and/or functional performance of the circuit.

FIG. 1 is a simplified schematic plan view representation of an integrated circuit 9 in which circuit elements 1-6 are arranged to illustrate how circuit defects on the circuit can affect the electrical and/or functional performance of the circuit 9. As illustrated, sub-circuits 1 and 3 are connected to one another by a first conductive line 2, sub-circuits 3 and 5 are connected to one another by a second conductive line 4, and sub-circuits 3 and 5 are connected to one another by a third conductive line 6. In addition, the circuit 9 includes other features or defects that can impair the performance of the circuit, thereby reducing the circuit's yield.

For example, the first conductive line 2 connecting sub-circuits 1 and 3 is positioned in close proximity to an additional conductive line 2a. With this positioning, any extra material that is formed on the first conductive line 2 can create a "short defect" to the additional conductive line 2a, depending on how much extra material is formed. To illustrate how the "short defect" depends on how much extra material is formed, FIG. 1 depicts a four "short defect" scenarios 10-13. In the first scenario 10, there is no extra material defect. In the second scenario 11, there is a relatively small extra material defect on the first conductor 2. In the third scenario 12, there is a relatively larger extra material defect on the first conductor 2, while the fourth scenario 13 shows that the extra material creates a short defect.

In addition to "short defects," the performance (and therefore yield) of the circuit 9 can also be reduced by "open defects," such as can occur when a circuit element (e.g., the second conductive line 4 connecting sub-circuits 3 and 5) is positioned in close proximity to a non-conductive contaminant or particle defect 4a. FIG. 1 depicts four scenarios 20-23 to show how an "open defect" can be created on the second conductive line 4, depending on the positioning of the particle defect 4a. In the first scenario 20, there is no overlap between the particle defect 4a and the second conductive line 4. In the second scenario 21, there is a small overlap between the particle defect 4a and the second conductive line 4. In the third scenario 22, there is a larger overlap between the particle defect 4a and the second conductive line 4, while the fourth scenario 23 shows that the particle defect 4a is blocking the second conductive line 4 to create an open defect.

Yet another defect that can reduce the performance (and therefore yield) of the circuit 9 is an alignment defect, such as can occur when a circuit element (e.g., the third conductive line 6 used to connect sub-circuits 5 and 1) does not properly align with another circuit element (e.g., via connection 6a). FIG. 1 depicts four scenarios 30-33 to show how an "alignment defect" can be created between the third conductive line 6, depending on the positioning of the via 6a. In the first scenario 30, there is complete overlap between the via 6a and the third conductive line 6. In the second scenario 31, there is substantial overlap between the via 6a and the third conductive line 6. In the third scenario 32, there is partial overlap between the via 6a and the third conductive line 6, while the fourth scenario 33 shows that the via 6a is substantially non-aligned with the third conductive line 6.

In addition to feature defects, the integrated circuit 9 may include other yield-lowering defects, such as a low-power region 7 that limits or impairs the circuit performance. For example, if a circuit element (e.g., sub-circuit 3 or conductor line 4) resides in whole or in part in a low-power region 7, the circuit element may not be able to provide the required circuit function due to being underpowered. On the other hand, if the circuit element (e.g., sub-circuit 5 or conductor line 6) is not located in a low-power region, then the circuit element presumably can provide the required circuit function, at least to the extent that the circuit element has sufficient power. FIG. 1 depicts four scenarios to show how a "low power defect" can be created. In the first low-power scenario, a circuit element (such as sub-circuit 5) is entirely outside of a low-power region 7. In the second low-power scenario, a circuit element (such as the second conductive element 4) is located only partially in the low-power region 7. In the third low-power scenario, a circuit element (such as the first conductive element 2) is located substantially within the low-power region 7, while in the fourth low-power scenario, a circuit element (such as sub-circuit 3) is located entirely within the low-power region 7.

With conventional yield computation algorithms that compute POF values for a circuit based on the circuit's physical features, the first scenarios (e.g., 10, 20, 30) would presumably pass a yield test and the fourth scenarios (e.g., 13, 23, 33) would presumably fail a yield test. However, for the second scenarios (e.g., 11, 21, 31) and third scenarios (e.g., 12, 22, 32), the circuit element may or may not pass a yield test, depending on the yield test applied. With conventional yield tests, a systematic determination is made that a circuit element either passes or fails based solely on the extracted physical dimension information. This can lead to false yield computations where a nominal defect (e.g., the second or third scenarios) on a robust circuit element is determined to fail when the robustness of the circuit is sufficient to overcome the nominal defect. Likewise, false yield computations can occur when a nominal defect on a sensitive circuit element is determined to pass, when actually the sensitivity of the circuit is not sufficient to overcome the nominal defect.

To eliminate or reduce such errors in the yield computation, various embodiments of the present invention compute a POF or yield value that takes into account an electrical or functional sensitivity of the circuit element being evaluated. In a first illustrative embodiment, an electrical sensitivity (ES) value is assigned to the first conductive element 2 to, in effect, define the robustness of the first conductive element 2. For example, the ES value can be extracted from the electrical circuit layout information to provide an indication of how much timing slack exists for communicating a signal over the first conductive element 2, so that a first timing slack value (e.g., a relatively higher value) is assigned if the first conductive element 2 requires a tight or short signal delivery, while a second timing slack value (e.g., a relatively lower or 0 value) is assigned if the first conductive element 2 does not require a tight or short signal delivery. In addition or in the alternative, the ES value can be extracted from the electrical circuit layout information to provide an indication of how much power is provided to the circuit element. For example, if the circuit element being evaluated (e.g., first conductive element 2) resides in whole or in part in a low-power region 7 of the integrated circuit 9, a first power sag value (e.g., a relatively higher value) is assigned to the circuit element. On the other hand, if the circuit element being evaluated (e.g., third conductive element 6) is not located in a low-power region, then a second power sag value (e.g., a relatively lower value) is assigned to the circuit element. As will be appreciated, other ES values can be extracted and assigned to each circuit element, such as device capability values that quantify the robustness of the circuit element in terms of its compliance with the device specification, or any other desired performance value that quantifies the robustness or sensitivity of a circuit element.

In accordance with various embodiments of the present invention, the ES values can be defined using any desired function, including but not limited to binary functions, analog functions, threshold functions, multi-variable functions or any combination of one or more of the foregoing. However, by using a larger ES value for sensitive circuit elements, a baseline POF may be adjusted upward for sensitive circuit elements, while the baseline POF is adjusted downward for robust circuit elements. For example, a baseline POF may be computed for the likelihood of a short defect for the first conductive element 2 based on the physical features of the first conductive element 2, and then adjusted upward or downward based on how much timing slack is available for signals sent on the first conductive element 2. As will be appreciated, the baseline POF can be computed with any of a variety of well established techniques, such as by applying a dot throwing analysis or critical area analysis to a measured defect density per diameter profile to estimate a baseline POF for short defects in the circuit element under analysis. An example methodology for computing a baseline POF is described at S. Fitzpatrick et al., "A Comparison of Critical Area Analysis Tools," IEEE/SEMI Advanced Semiconductor Manufacturing Conference and Workshop, pp. 31-33 (September 1998). To compute an adjusted POF value, the baseline POF is combined with a first timing slack value using any predetermined mathematical function (e.g., addition or multiplication) to adjust the baseline POF value upward for sensitive circuit elements. With the larger adjusted POF value, the first conductive element 2 in the third "short defect" scenario 12 is more likely to fail a yield test, reflecting the fact that a signal sent along the first conductive element 2 travels more slowly in the third scenario 12 where the larger volume of the first conductive element 2 must be charged. Indeed, if the baseline POF is adjusted upward sufficiently by the timing slack value, the first conductive element 2 in the second "short defect" scenario 11 may also fail the yield test. Conversely, the baseline POF may be mathematically combined with the smaller second timing slack value to adjust the baseline POF value downward for robust circuit elements in which the timing slack requirement is fairly relaxed. With the smaller adjusted POF value, the first conductive element 2 in the second or third "short defect" scenarios 11, 12 are less likely to fail a yield test, reflecting the fact that a signal sent along the first conductive element 2 in the second or third scenarios will arrive in time since the timing slack is relaxed.

As another example, a baseline POF is computed for the likelihood of an alignment defect for the third conductive element 6 based on the physical features of the third conductive element 6 and via 6a, such as by applying a dot throwing analysis or critical area analysis to a measured defect density per diameter profile to estimate a baseline POF for alignment defects in the circuit element under analysis. In addition, the baseline POF is adjusted upward or downward on the basis of power sensitivity of the third conductive element. As will be appreciated, the power sag regions for a particular device are predictably determined using power analysis techniques. When it is determined that a circuit element (e.g., third conductive element 6) is located in a low-power region, a baseline POF for the circuit element is mathematically combined with a first power sag value to adjust the baseline POF value upward. With the larger adjusted POF value, the third conductive element 6 in the third "alignment defect" scenario 32 is more likely to fail a yield test, reflecting the fact that the current flow is reduced by virtue of the third conductive element 6, and therefore less likely to convey signal current through the partially aligned third conductive element 6 and via 6a. Indeed, if the baseline POF is adjusted upward sufficiently by the power sag value, the third conductive element 6 in the second "alignment defect" scenario 31 may also fail the yield test. Conversely, the baseline POF may be mathematically combined with the smaller second power sag value to adjust the baseline POF value downward for robust circuit elements in which full power or substantially full power is provided.

As yet another example, an adjusted POF value may be computed to account for open defects in a circuit element based on the robustness of the circuit element. First, a baseline POF is computed for the likelihood of an open defect for the second conductive element 4 based on the physical features of the second conductive element 4 using an desired technique, such as by applying a dot throwing analysis or critical area analysis to a measured defect density per diameter profile to estimate a baseline POF for open defects in the circuit element under analysis. Next, the baseline POF is combined with a first electrical sensitivity value using any predetermined mathematical function (e.g., addition or multiplication) to adjust the baseline POF value upward for sensitive circuit elements. With the larger adjusted POF value, the second conductive element 4 in the third "open defect" scenario 22 is more likely to fail a yield test, reflecting the fact that a signal sent along the second conductive element 4 travels more slowly in the third scenario 22 where the second conductive element 4 is almost entirely blocked by the particle 4a. Indeed, if the baseline POF is adjusted upward sufficiently by the sensitivity value, the second conductive element 4 in the second "open defect" scenario 21 may also fail the yield test. In similar fashion, the baseline POF may be mathematically combined with the smaller second sensitivity value to adjust the baseline POF value downward for robust circuit elements that are not likely to be affected by the partial blockage.

In addition to adjusting POF values with electrical sensitivity information, functional information may also be extracted from the circuit being analyzed and used to adjust the baseline POF values in accordance with various embodiments of the present invention. By assigning a functional sensitivity (FS) value to a circuit element or sub-circuit, the robustness of the circuit element is defined in terms of the sensitivity of the element's functionality to the overall circuit. For example, the FS value can be extracted from an SOC level analysis of the overall circuit to provide an indication of the redundancy of the circuit element's functionality, so that a first redundancy value (e.g., a relatively higher value) is assigned if the circuit element provides a unique function to the overall circuit (e.g., a charge pump circuit for controlling a substrate voltage), while a second redundancy value (e.g., a relatively lower value) is assigned if the circuit element is backed up by redundant circuits (e.g., a replacement memory array). In addition or in the alternative, the extracted FS value can provide an indication of how critical the circuit element's function is to the overall system. For example, if the circuit element being evaluated provides an operative functionality, such as a built-in self test (BIST) circuit, a first criticality value (e.g., a relatively higher value) is assigned to the circuit element, reflecting the importance of the BIST circuit functionality to the overall circuit operation. On the other hand, if the circuit element being evaluated does not provide a critical function, then a second criticality value (e.g., a relatively lower value) is assigned to the circuit element. FS values other than, or in addition to, redundancy values and criticality values can be extracted and assigned to each circuit element to quantify the functional significance of the circuit element, and can be defined using any desired function, including but not limited to binary functions, analog functions, threshold functions, multi-variable functions or any combination of one or more of the foregoing.

As described herein, a baseline POF may be adjusted upward by using a larger ES or FS value for sensitive circuit elements, and adjusted downward for less significant circuit elements. With the adjusted POF value, individual circuit elements may be evaluated by applying a predetermined yield test to the adjusted POF to determine if the adjusted POF exceeds a predetermined yield test threshold. Of course, individual circuit elements may also be evaluated without adjusting the baseline POF value by using an adaptive yield test threshold, so that a lower yield test threshold is applied to the baseline POF value for sensitive circuit elements, while a higher yield test threshold is applied to the baseline POF value for robust circuit elements.

Figure 2:
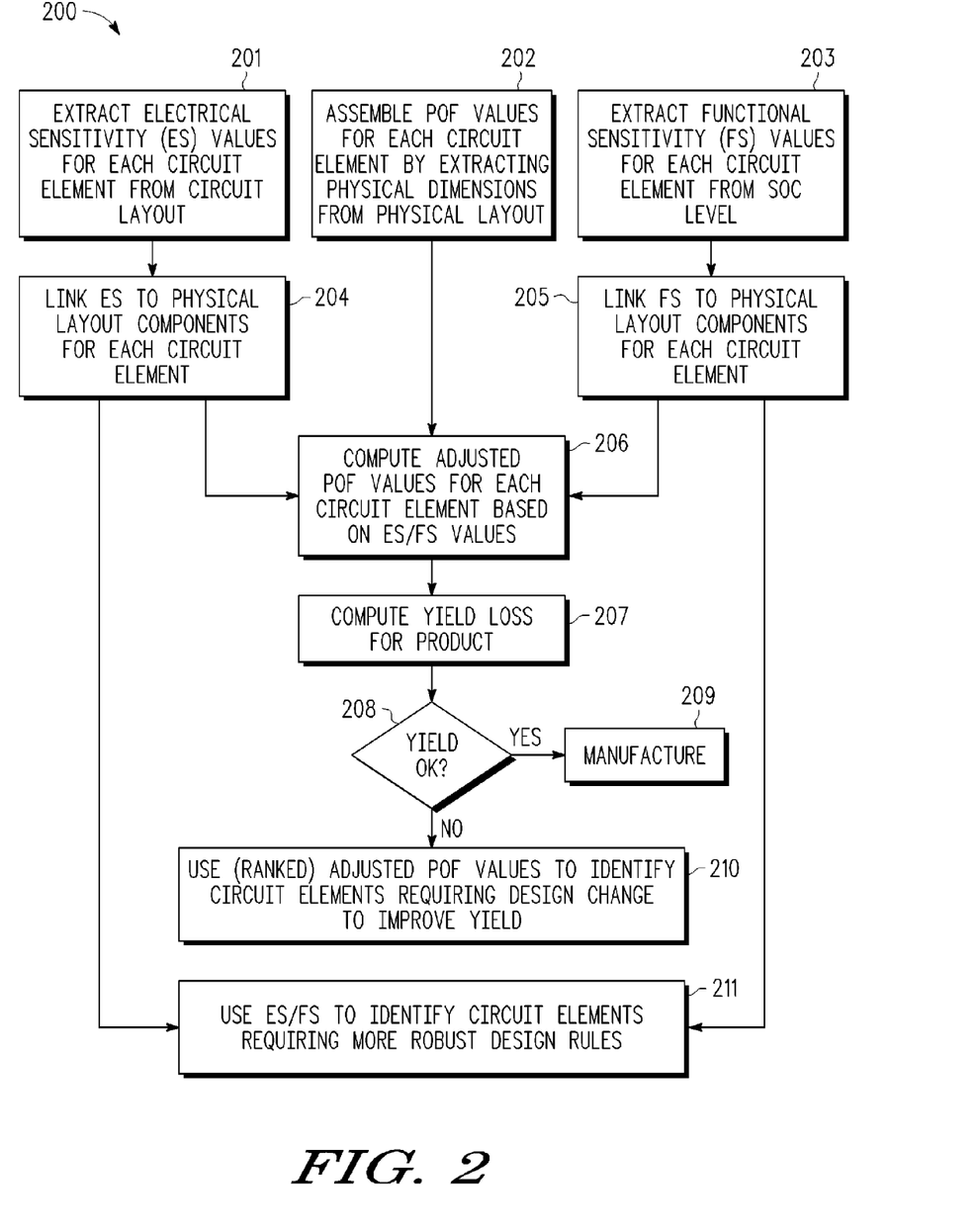
FIG. 2 is a flow diagram illustrating a process for extracting electrical and/or functional sensitivity information for individual circuit elements to calculate an actual yield loss for the circuit.

FIG. 2 is a flow diagram illustrating a process 200 for extracting electrical and/or functional sensitivity information for individual circuit elements to calculate an actual yield loss for the circuit. As shown, the process involves assembling POF values for one or more circuit elements (e.g., conductive lines, nets, sub-circuits, etc.) by extracting physical dimension information from the physical layout of the circuit being analyzed (step 202). At step 201, electrical sensitivity (ES) information is extracted for one or more circuit elements using any desired technique, such as by performing timing analysis, power analysis, circuit simulations, etc. The extracted ES information may be represented as numeric values that identify or quantify any desired electrical or performance value for the circuit element, such as a timing slack value, a power sag value, or some other performance measure for the circuit element. Once the ES values are extracted for the circuit element(s), the extracted information may be linked or tagged to the physical layout components for each circuit element (step 204). The linking functionality may be accomplished in a variety of ways, including using layout markers, special datatypes, or even a separate meta-database to keep track of the ES values for each circuit element. For example, where a circuit element that is defined in an electrical layout for the circuit is implemented with a plurality of shapes defined in a physical layout for the circuit, the ES values for the circuit element may be stored with the physical layout information in the form of tags that are stored as shapes in an arbitrary layer that correspond in shape to the actual shapes used to make the circuit element in question.

In addition or in the alternative to extracting ES values, functional sensitivity (FS) information may be extracted for each circuit element (step 203) using any desired technique, such as by performing a System-on-Chip (SOC) analysis. The extracted FS information may be implemented as numeric values representing any desired functional value for the circuit element, such as a redundancy value, a criticality value, or some other functionality measure for the circuit element. In addition, the FS values for each circuit element may be linked or tagged to the physical layout components in a variety of ways (step 205), including using layout markers, special datatypes, or even a separate meta-database to keep track of the FS values for each circuit element.

Using the extracted ES values and/or FS values, an adjusted POF value is computed for each circuit element (step 206). In an example implementation, a baseline POF value (such as generated at step 202) is adjusted using a plurality of ES values in order to derive the adjusted POF value for each circuit element. In this example, an adjusted POF value is computed for a circuit element (such as the third conductive element 6 and connection via 6a shown in FIG. 1) using a mix of electrical sensitivity functions, including a timing sensitivity value and power sensitivity value. A first electrical sensitivity function, eSens_time, can be defined to characterize the timing signal sensitivity of the circuit element. For example, eSens_time can be created as a binary sensitivity value so that eSens_time=1 if the time slack for the element <5 ns, and eSens_time=0 if the time slack for the element >5 ns. In addition, a second electrical sensitivity function, eSens_power, can be defined to characterize the power level sensitivity of the circuit element. For example, eSens_power can be created as an analog sensitivity value so that eSens_power=1.2 if the power sag for the element >10%, and eSens_power=0.3 if the power sag for the element <10%. With these two electrical sensitivity functions, the actual POF can be calculated as follows:

ActualPOF=$POF_{Baseline}$*eSens_time*eSens_power, where ActualPOF is the adjusted POF, and $POF_{Baseline}$ is the baseline POF value for the circuit element. With this example, if a circuit element being evaluated is a via on path with lot of time slack, then the adjusted POF is determined as ActualPOF=1$ppb$*0*eSens_power=0$ppb$, where the baseline POF is 1 ppb. With this adjustment of the baseline POF, the computation indicates that there is no yield loss associated with this element. Consider now the scenario where the via is on a path with little time slack, but no power sag. In this scenario, the adjusted POF is determined as ActualPOF=1$ppb$*1*0.3=0.3$ppb$, meaning that there is a small yield loss associated with this element. Finally, if via is on a path with little time slack and with power sag, then the adjusted POF is determined as ActualPOF=1$ppb$*1*1.2=1.2$ppb$, meaning that there is a strong yield loss associated with this element.

By computing an adjusted POF value, a cross-analysis on the layout features (defined by the baseline POF values) and the sensitivity information (defined by the ES and/or FS values) is effectively performed to obtain an actual yield loss computation that more accurately reflects the electrical and/or functional sensitivity of the overall circuit. With the adjusted POF values assembled for the overall circuit, the overall yield loss may be computed (step 207), such as by computing the product of all adjusted POF values. If the overall computed yield loss satisfies a predetermined criterion (such as by being below a maximum yield loss value) (affirmative outcome to decision block 208), the circuit is ready for manufacture (step 209), at least as far as the yield loss requirements are concerned. As will be appreciated, the manufacture step refers generally to the process of making or building an integrated circuit chip once the layout design has been corrected and/or finalized by using the enhanced yield loss calculation to correct layout issues. In this process, once the layout is corrected, the layout design is verified, such as by checking for design rule compliance, layout vs. schematic compliance, etc. After verification, the layout design is sent to the mask maker as part of the tape out phase so that masks can be generated. These masks are used in the photolithography or optical lithography process during chip manufacturing to fabricate semiconductor devices. With lithography processes, semiconductor devices are fabricated by transferring a pattern from a photomask or reticle to an underlying substrate or layer using various processing steps, such as substrate preparation, photoresist application, soft-baking, exposure, developing, hard-baking, etching and/or other chemical treatments.

On the other hand, if the overall computed yield loss is not satisfactory (negative outcome to decision block 208), then the circuit design may be adjusted to reduce yield loss (step 210), such as by sending low-yield circuit elements to a manual or automated layout fixing tool in order to improve the yield of the product. To this end, the adjusted POF values may be used to identify the circuit elements requiring a design change. The adjusted POF values may also be sorted to rank the circuit elements for priority in terms of which elements should be fixed first. The ranking of the adjusted POF values can also be used to identify a predetermined number of the highest ranking circuit elements that are to be re-designed. Depending on the type of circuit element in question, it will be appreciated that a variety of design changes can be made to make the circuit element more robust, thereby reduce yield loss. For example, conductive lines can be made more robust by increasing the width of the lines (to reduce open defects) and/or by increasing the spacing between lines (to reduce short defects). In addition, connection vias can be made more robust by increasing the number of vias or the by increasing the size of the conductive lines. Once the layout issues are corrected, the process may be repeated as needed by updating the POF, ES and/or FS values as needed to determine new adjusted POF and yield loss values until an acceptable yield loss is obtained (affirmative outcome to decision block 208), at which point the circuit design proceeds to manufacture (step 209) where the circuit and layout design are verified, taped out and used to fabricate an integrated circuit device.

There are other possible benefits from extracting circuit sensitivity information. For example, in selected embodiments, the extracted ES values and/or FS values can be used preventatively to select more robust design rules at the outset for circuit elements that are tagged as electrically or functionally sensitive. In FIG. 2, this is illustrated at step 211, which is depicted as using the linked ES values (generated at step 204) and/or the linked FS values (generated at step 205). However, it will be appreciated that step 211 may directly access the ES values (generated at step 201) and/or the FS values (generated at step 203).

Figure 3:
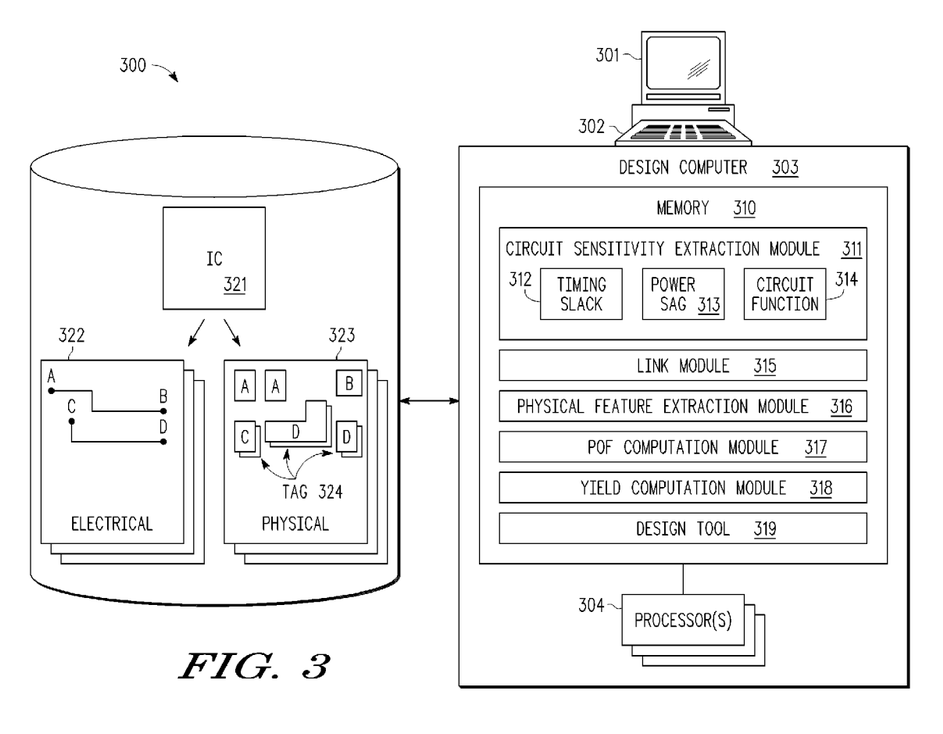
FIG. 3 illustrates a computer-based system for analyzing a circuit design for electrical sensitivity and calculating a manufacturing yield based on the electrical sensitivity.

Referring now to FIG. 3, there is illustrated an architectural diagram of an exemplary computer system 300 for analyzing a circuit design for electrical sensitivity and calculating a manufacturing yield based on the electrical sensitivity. In accordance with various illustrative embodiments of the present invention, the computer system 300 may be found in many forms including, for example, mainframes, minicomputers, workstations, servers, personal computers, internet terminals, notebooks, wireless or mobile computing devices (including personal digital assistants), embedded systems and other information handling systems, which are designed to provide computing power to one or more users, either locally or remotely. In the example depicted in FIG. 3, the computer system 300 is implemented as an design computer 303 which includes a memory storage device 310 (which may include mass storage memory and local RAM memory), one or more microprocessor or central processing units (CPU) 304, input devices 302 (e.g., keyboard, mouse, etc.) and output devices 301 (e.g., display, speakers, etc.). In addition, the design computer 303 is communicatively coupled to a storage device 320, which may be implemented as an external I/O resource or storage system for storing electrical design information 322 and physical layout design information 323 for an integrated circuit 321 being analyzed.

The memory storage device 310 stores program and data files that are used for extracting values from a circuit's electrical, functional and/or physical features that are linked to the circuit's physical layout design information and that are used to compute an adjusted POF value, including a circuit sensitivity extraction program module 311, a linking program module 315, a physical feature extraction program module 316, a POF computation program module 317 and a yield computation program module 318. In particular, the memory storage device 310 includes an addressable memory that is used by the processor 304 to execute and load the various program modules and data files during analysis of the integrated circuit 321, whereby specific circuit performance-related values are generated for individual circuit elements or nets in the integrated circuit 321 which may be used to compute adjusted POF values and a predicted yield value for the overall circuit and/or to fix layout features for purposes of improving the circuit yield.

One of the modules in the memory 310 is a circuit sensitivity extraction module 311 which is used to extract and/or store one or more values characterizing the electrical and/or functional sensitivity of individual circuit elements. As illustrated, the module 311 extracts and/or stores timing slack information 312, power sag information 313 and circuit function information 314, through other types of sensitivity information can be extracted and/or stored.

The memory 310 may include a linking module 315 which is used to tag the integrated circuit 321 with appropriate electrical and/or functional sensitivity information. An example of the linking function is illustrated in FIG. 3 with respect to the circuit element C-D that is defined in an electrical layout 322 for the integrated circuit 321, where the circuit element C-D is implemented with a plurality of shapes C, D defined in a physical layout 323 for the circuit 321. In particular, the extracted ES values for the circuit element C-D are linked to the device 321 by storing tags 324 with the physical layout information 323 as shapes in an arbitrary layer that correspond in shape to the actual shapes C, D used to make the circuit element C-D.

A physical feature extraction module 316 is also included in the memory 310 and used to generate baseline POF values for individual circuit elements in the device 321. The baseline POF values may be extracted from the physical dimension information 323 using known techniques. Once the baseline POF values are obtained, the POF computation module 317 computes adjustments to the POF values based on the extracted sensitivity information. The POF computation module 317 may also include functionality for using the adjusted POF values to identify and/or rank circuit elements that fail a predetermined yield test or that otherwise require redesign.

The memory 310 may also include a yield computation module 318 which processes the adjusted POF values to compute the predicted yield for the entire circuit 321. In an example, embodiment, the predicted yield for the entire circuit may be computed as the product of all adjusted POF values, though other techniques may be used. The memory 310 may also include a design tool 319 for manually or automatically making adjustments to the design of any circuit elements that are identified by the POF computation module 317 as yield losses or otherwise requiring redesign.

As described herein, the POF computation module 317 is provided to compute adjusted POF values so that a more accurate yield test can be applied to the individual circuit elements. This may be illustrated with the various scenarios depicted in FIG. 1, and in particular, with the second and third scenarios shown in FIG. 1 that would be indeterminate (depending on the yield test applied) under conventional CAA yield test methodologies, thereby resulting in false yield computations. For example, by adjusting the POF value for the first conductive element 2 in the second "short defect" scenario 11 upward when the first conductive element 2 is part of a sensitive circuit path, a more accurate POF is computed to reflect the electrical performance of the first conductive element 2. With a higher adjusted POF value, the first conductive element 2 in the second "short defect" scenario 11 (or the third "short defect" scenario 12) may be accounted as a yield loss (e.g., by exceeding a predetermined yield loss threshold). On the other hand, if the first conductive element 2 is part of a robust circuit path, the POF value for the first conductive element 2 in the second "short defect" scenario 11 (or the third "short defect" scenario 12) may be adjusted downward so that the over-print of the first conductive element 2 is waived.

In similar fashion, when the second conductive element 4 in the third "open defect" scenario 22 is part of a robust circuit path, the POF value for the second conductive element 4 may be adjusted downward, thereby generating a more accurate POF to reflect the electrical performance of the robust second conductive element 4. With a lower adjusted POF value, the second conductive element 4 in the third "open defect" scenario 22 may be waived. On the other hand, if the second conductive element 4 is part of a sensitive circuit path, the POF value for the second conductive element 4 in the third "open defect" scenario 22 may be adjusted upward so that the second conductive element 4 accounted as a yield loss (e.g., by exceeding a predetermined yield loss threshold).

The same approach may be applied to reflect how power is applied to the circuit. For example, if the circuit element being evaluated (e.g., second conductive element 4) resides in whole or in part in a low-power region 7, a first power sag value (e.g., a relatively higher value) is assigned to the circuit element and is used to adjust the POF value for the circuit element upward, thereby generating a more accurate POF to reflect the electrical performance of the sensitive circuit element. Conversely, if the circuit element being evaluated (e.g., third conductive element 6) is not located in a low-power region, then a second power sag value (e.g., a relatively lower value) is assigned to the circuit element and used to adjust the POF value for the circuit element downward.

As described herein, the baseline POF values may be adjusted on the basis of one or more circuit sensitivity measures for each circuit element. Alternatively, the extracted circuit sensitivity measures may be used to adjust the yield test threshold down that is applied to the baseline POF values, so that the yield test threshold is lowered for sensitive circuit elements, and raised for robust circuit elements. Regardless of which approach is used, the result is that different levels of defect detection may be controlled by taking into account the electrical or functional sensitivity of the circuit element being analyzed. Thus, while conventional yield tests would be applied to detect complete blockages, but would be indeterminate as applied to partial blockages, selected embodiments of the present invention provide a more accurate detection of defects by using the sensitivity measure for the circuit element to more selectively detect defects for electrically and/or functionally sensitive circuit elements.

Figure 4:
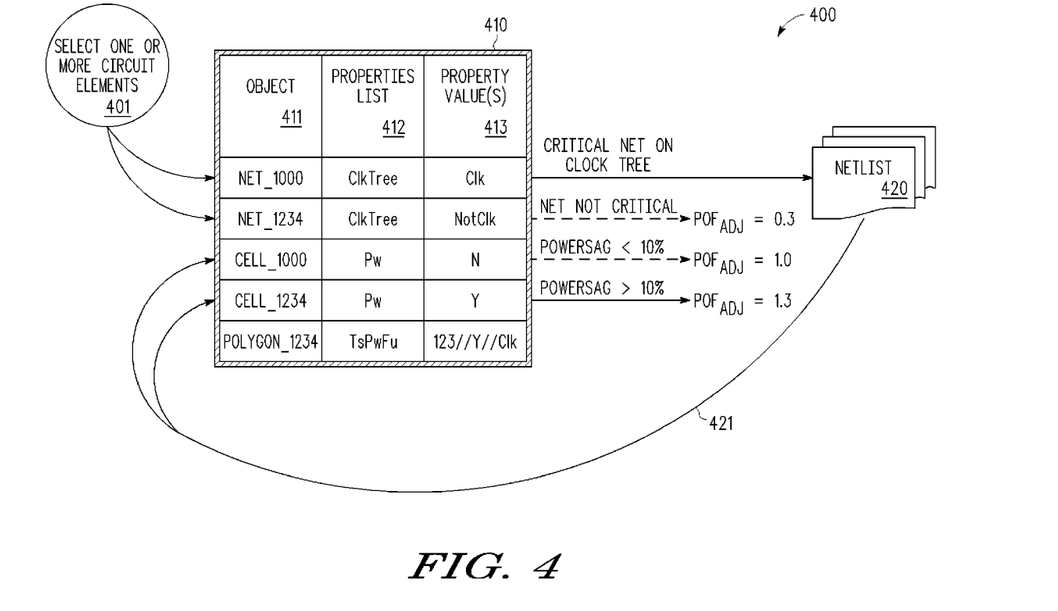
FIG. 4 schematically illustrates a process flow for using a database to link circuit elements with POF adjustment factors.

FIG. 4 schematically illustrates a process flow 400 for using a database 410 to link circuit elements with POF adjustment factors that can be used to perform design for manufacture (DFM) testing on a proposed integrated circuit design. In the example depicted in FIG. 4, DFM testing is applied to find which circuit nets or elements in the integrated circuit design are performing a critical function in the overall integrated circuit or are located in power sag areas on the integrated circuit chip. The process begins at block 401 by selecting one or more circuit elements to be tested. Once a circuit element is selected (e.g., NET_1000), a database 410 is accessed to identify a unique identifier (e.g., in the "Object" column 411) which corresponds to the selected circuit element. For each unique circuit element identifier in the database 410, there is an associated listing of one or more electrical or functional properties stored in the data base (e.g., in the "Properties List" column 412) and specified values for the listed properties (e.g., in the "Properties Value(s)" column 413) that correspond to the selected circuit element. Thus, the unique identifier for a selected circuit element is used to extract one or more electrical and/or functional sensitivity values from the table 410, which in turn can be used to generate adjusted POF values for each circuit element.

For example, the database 410 includes a "ClkTree" property in the "Properties List" column 412 which indicates whether the selected circuit element (e.g., "NET_1000") is located on a critical circuit net, such as a clock tree. If a first predetermined value (e.g., "NotClk") is specified in the value column 413 of the database 410 for the "ClkTree" property, this indicates that the corresponding circuit element (e.g., "NET_1234") is not on a critical circuit net. In this case, an appropriate, relatively low POF adjustment factor (e.g., $POF_{adj}=0.3$) is applied to the baseline POF for the selected NET_1234 circuit element, where the POF adjustment factor is either retrieved directly as a value from the database 410, or is otherwise derived by applying a derivative function (such as a decision tree) to generate the POF adjustment factor. If, on the other hand, a second predetermined value (e.g., "Clk") is specified in the value column 413 of the database 410 for the "ClkTree" property, this indicates that the corresponding circuit element (e.g., "NET_1000") is on a critical circuit net. In this case, an appropriate, relatively higher POF adjustment factor (e.g., $POF_{adj}=1.1$) can be derived and applied to the baseline POF for the selected NET_1000 circuit element. In addition or in the alternative, the second predetermined value may be used to trigger another query to retrieve from a netlist 420 a list of all circuit elements in the selected NET_1000 circuit element (as indicated at line 421). Once a constituent circuit element (e.g., CELL_1000) is retrieved, the database 410 is again accessed to identify a corresponding unique identifier in the "Object" column 411 which may have associated therewith one or more different electrical or functional properties stored in the data base (e.g., in the "Properties List" column 412) and specified values for the listed properties (e.g., in the "Properties Value(s)" column 413) that correspond to the retrieved circuit element. For example, the database 410 includes a "Pw" property in the "Properties List" column 412 which indicates whether the retrieved circuit element is located in a power sag region of the chip. If a first predetermined value (e.g., "N") is specified in the value column 413 of the database 410 for the "Pw" property, this indicates that the corresponding circuit element (e.g., "CELL_1000") is not on in a power sag region. In this case, an appropriate, relatively low POF adjustment factor (e.g., $POF_{adj}=1.0$) is applied to the baseline POF for the retrieved CELL_1000 circuit element, where the POF adjustment factor is either retrieved directly as a value from the database 410, or is otherwise derived by applying a derivative function (such as a decision tree) to generate the POF adjustment factor. On the other hand, if a second predetermined value (e.g., "Y") is specified in the value column 413 of the database 410 for the "Pw" property, this indicates that the corresponding circuit element (e.g., "CELL_1234") is in a power sag region. In this case, an appropriate, relatively high POF adjustment factor (e.g., $POF_{adj}=1.3$) can be applied to the baseline POF for the retrieved CELL_1234 circuit element.

As will be appreciated, the database 410 may be store more than a single property and value for each circuit element, and may include a coded list of one or more properties and associated property values for each element. For example, the database 410 includes a unique identifier for a "POLYGON_1234" circuit element (bottom row) which has associated therewith a coded list of three properties—TsPwFu—in the "Properties List" column 412. In this coded list, the "Ts" component property indicates the amount of timing slack associated with the "POLYGON_1234" circuit element; the "Pw" component property indicates whether the "POLYGON_1234" circuit element is located in a power sag region of the chip; and the "Fu" component property indicates whether the "POLYGON_1234" circuit element is located on a critical circuit net, such as a clock tree. In the value column 413 of the database 410, the values are stored for the coded list of properties for the "POLYGON_1234" circuit element stored (e.g., Ts=123 ps, Pw=Y and Fu=Clk). These stored values are then available for use in computing POF adjustment factors, either directly or indirectly, that are applied to the baseline POF value, which may also be stored in the database 410 as an entry associated with the "POLYGON_1234" circuit element.

As described above, the database 410 may be used to link circuit elements with POF adjustment factors that can be used to compute yield predictions for the circuit elements. Once the database 410 is populated with property values corresponding to each listed property for the identified circuit elements, DFM testing and yield prediction computations may be efficiently conducted on an integrated circuit design since the stored database information eliminates the need to re-compile the electrical/functional property values for each circuit element. Of course, if and when design changes are made to individual circuit elements, only the specific entries in the database 410 corresponding to the changed circuit element need to be changed or updated.

Figure 5:
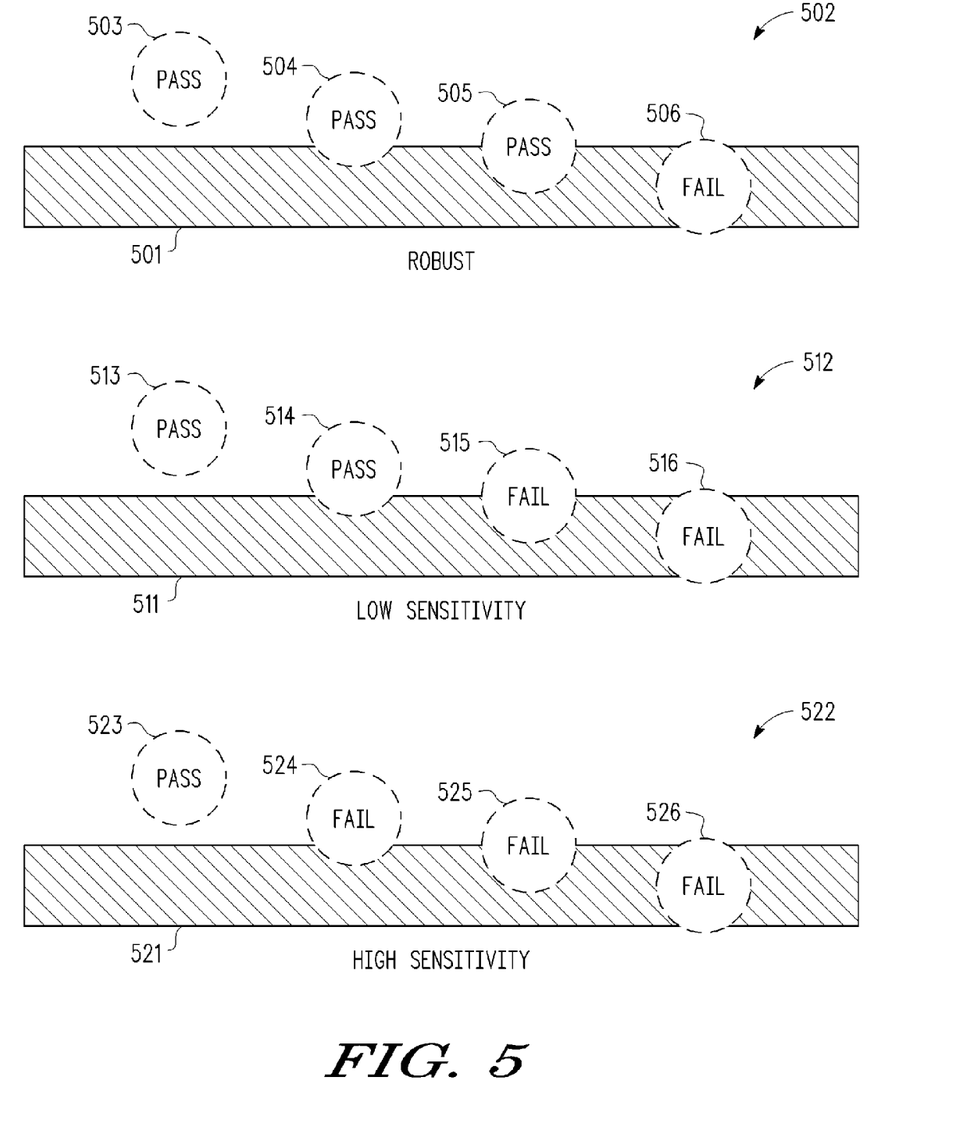
FIG. 5 illustrates an example of how sensitivity aware detection may be implemented to detect particle defects on a conductive line.

FIG. 5 illustrates three different examples of how sensitivity aware detection may be implemented to detect particle defects on a conductive line. Where a first conductive line 501 is a robust circuit that has low sensitivity to physical device imperfections (such as particle defects), the yield test results 502 applied to such a robust circuit element 501 result in failure only when the line is completely blocked by a particle 506, but otherwise passes the partial blockages 504-505 and the non-blocking particle 503. However, in some cases, the circuit elements (such as the second conductive line 511) are less robust circuits that have a low sensitivity to physical device imperfections because of the way the circuit is designed (i.e., leaving little timing slack for signals) or constructed (i.e., with lower power regions). With such circuit elements 511, the yield test results 512 result in a higher failure rate which includes failure from a complete blockage 516 or substantial blockage 515, but otherwise passes the partial blockage 514 and the non-blocking particle 513. Finally, for the circuit elements (such as the third conductive line 521) that have a high sensitivity to physical device imperfections because of the way the circuit is designed, the yield test results 522 result in a failure rate which includes failure from a complete blockage 516, a substantial blockage 515, and a partial blockage 524, passing only the non-blocking particle 523.

By now it should be appreciated that there has been provided a method and system for determining a yield prediction for an integrated circuit. In the disclosed method and system, circuit layout information is received for an integrated circuit having one or more circuit elements, where the circuit layout information includes an electrical circuit representation and a physical layout representation for each circuit element. From the electrical circuit representation, electrical sensitivity and/or functional sensitivity information is extracted for each of the one or more circuit elements. The information can be extracted in a variety of ways. For example, extraction can occur by assigning a first sensitivity value to each circuit element that is electrically robust and assigning a second sensitivity value to each circuit element that is electrically sensitive, where the first sensitivity value is smaller than the second sensitivity value. In another example, extraction can occur by assigning an electrical sensitivity value to a first circuit element, where the electrical sensitivity value is a first timing slack value if a timing slack measure for the first circuit element is below a first threshold, and where the electrical sensitivity value is a second timing slack value if the timing slack measure for the first circuit element is above the first threshold. In another example, extraction can occur by assigning an electrical sensitivity value to a first circuit element, where the electrical sensitivity value is a first power sag value if a power sag measure for the first circuit element is above a first threshold, and where the electrical sensitivity value is a second power sag value if the power sag measure for the first circuit element is below the first threshold. In yet another example, extracting can occur by assigning a functional sensitivity value to a first circuit element, where the functional sensitivity value is a first criticality value if the first circuit element provides a critical function to the integrated circuit (e.g., a BIST circuit), and where the functional sensitivity value is a second criticality value if the first circuit element does not provide a critical function to the integrated circuit (e.g., a memory array column). In yet another example, extracting can occur by assigning a functional sensitivity value to a first circuit element, where the functional sensitivity value is a first redundancy value if the first circuit element provides a redundant function to the integrated circuit, and where the functional sensitivity value is a second redundancy value if the first circuit element does not provide a redundant function to the integrated circuit. Once extracted, the electrical sensitivity and/or functional sensitivity information for a circuit element may be linked to the physical layout representation for that circuit element. In addition, a baseline probability of failure (POF) value is extracted from the physical layout representation for each the circuit elements. By mathematically combining the electrical sensitivity and/or functional sensitivity information for each of the one or more circuit elements with its corresponding baseline POF value, an adjusted POF value is computed for each circuit element. In various embodiments, the computation of the adjusted POF may be implemented by decreasing the baseline POF value for a first circuit element by a first electrical sensitivity value if the first circuit element is electrically robust, and increasing the baseline POF value for the first circuit element by a second electrical sensitivity value if the first circuit element is not electrically robust. In addition, by combining the adjusted POF values for the circuit elements, a yield prediction may be determined for the integrated circuit. In addition, the adjusted POF values may be used to identify circuit elements requiring some adjustment or redesign, such as be identifying circuit elements having an adjusted POF value that does not meet a predetermined yield test criteria. Once the circuit elements are identified, one or more attributes of the circuit element may be adjusted or redesigned to reduce defects in the circuit element. However, if the predicted yield satisfies one or more predetermined criteria (such as by being below a maximum yield loss value), the layout information may be verified, and an integrated circuit may be fabricated based on the layout information that has been verified.

In another form, there is provided a method and system for designing an integrated circuit. As disclosed, an integrated circuit design is received that includes an electrical circuit representation and a physical layout representation for one or more circuit elements. Physical dimension parameters for a circuit element are used to generate a baseline probability of fault (POF) value for the circuit element. In addition, one or more predetermined performance criteria are applied to the electrical circuit representation of the circuit element to generate one or more circuit sensitivity values for the circuit element. While any performance criteria can be applied, in selected embodiment, the performance criteria is an electrical sensitivity criteria to determine if the circuit element meets a timing slack threshold requirement. In addition or in the alternative, the performance criteria is an electrical sensitivity criteria to determine if the circuit element meets a power sag threshold requirement. In yet another embodiment, the performance criteria is a functional sensitivity criteria to determine if the circuit element provides a critical circuit function, such as being part of a clock tree. The circuit sensitivity values are used to adjust the baseline POF value to compute an adjusted POF value for the circuit element. In addition, the adjusted POF values are linked to the physical layout representation for the circuit element. The linking may be accomplished by maintaining a database in which each physical layout representation for each circuit element is uniquely identified and associated with the one or more circuit sensitivity values corresponding to the circuit element, or by tagging physical layout representation information for each circuit element with the one or more circuit sensitivity values corresponding to the circuit element. Finally, the adjusted POF value for the circuit element is used to determine a yield prediction for the integrated circuit. If the predicted yield satisfies one or more predetermined criteria (such as by being below a maximum yield loss value), the physical layout representation may be verified, and an integrated circuit may be fabricated based on the physical layout representation that has been verified. However, if the predicted yield is not adequate, a circuit element having an adjusted POF value that does not meet a predetermined yield test criteria may be identified and its attributes adjusted to reduce defects in the circuit element. In response to the adjusting of the attribute(s) of the circuit element, the physical layout representation may be modified, and an integrated circuit may be fabricated based on the modified physical layout representation that has been verified if the yield prediction satisfies a predetermined criterion.

In yet another form, there is provided a computer-usable medium embodying computer program code, the computer program code comprising computer executable instructions configured for determining a yield prediction for an integrated circuit. The program code instructions act to receive circuit layout information for an integrated circuit formed with one or more circuit elements, where the circuit layout information includes an electrical circuit representation and a physical layout representation for each circuit element. The program code instructions also extract one or more circuit sensitivity values for each of the one or more circuit elements, and extract a baseline probability of failure (POF) value from the physical layout representation for each of the one or more circuit elements. For example, circuit sensitivity values may be extracted by assigning a first sensitivity value to each circuit element that is electrically robust, and assigning a second sensitivity value to each circuit element that is electrically sensitive, where the first sensitivity value is smaller than the second sensitivity value. In an example implementation, a first timing slack value is assigned to a first circuit element if a timing slack measure for the first circuit element is below a first threshold, and a second timing slack value is assigned to the first circuit element if the timing slack measure for the first circuit element is above the first threshold. In addition, the program code instructions compute an adjusted POF value for each of the one or more circuit elements by mathematically combining the one or more circuit sensitivity values for each of the one or more circuit elements with its corresponding baseline POF value, thereby determining a yield prediction for the integrated circuit based the adjusted POF values for each of the one or more circuit elements. The program code instructions may also be configured to identify a first circuit element having an adjusted POF value that does not meet a predetermined yield test criteria, and to adjust one or more attributes of the first circuit element to reduce defects in the first circuit element.

The methods and systems for computing a yield analysis using circuit sensitivity data as shown and described herein may be implemented in software stored on a computer-readable medium and executed as a computer program on a general purpose or special purpose computer to perform certain tasks. The software discussed herein may include script, batch, or other executable files. The software may be stored on a machine-readable or computer-readable storage medium, and is otherwise available to direct the operation of the computer system as described herein and claimed below. In one embodiment, the software uses instructions and data stored in a local or database memory to compute a manufacturing yield for an integrated circuit. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module. The computer-based data processing system described above is for purposes of example only, and may be implemented in any type of computer system or programming or processing environment, or in a computer program, alone or in conjunction with hardware. It is contemplated that the present invention may be run on a stand-alone computer system, or may be run from a server computer system that can be accessed by a plurality of client computer systems interconnected over an intranet network, or that is accessible to clients over the Internet. Although the described exemplary embodiments disclosed herein are directed to various computer-based systems and methods for performing a yield analysis, the present invention is not necessarily limited to the example embodiments which illustrate inventive aspects of the present invention that are applicable to a wide variety of processes and/or devices. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a system, process, method, article, or apparatus that comprises a list of elements does not include only those elements but may include other elements not expressly listed or inherent to such system, process, method, article, or apparatus.

What is claimed is:

1. A method for determining a yield prediction for an integrated circuit, comprising:
    receiving circuit layout information for an integrated circuit formed with one or more circuit elements, where the circuit layout information comprises an electrical circuit representation and a physical layout representation for each circuit element;
    extracting electrical sensitivity and/or functional sensitivity information for each of the one or more circuit elements;
    extracting a baseline probability of failure (POF) value from the physical layout representation for each of the one or more circuit elements;
    computing an adjusted POF value, by a computer, for each of the one or more circuit elements by mathematically combining the electrical sensitivity and/or functional sensitivity information for each of the one or more circuit elements with its corresponding baseline POF value; and
    determining a yield prediction for the integrated circuit based on the adjusted POF values for each of the one or more circuit elements.

2. The method of claim 1, further comprising:
    identifying a first circuit element having an adjusted POF value that does not meet a predetermined yield test criteria; and
    adjusting one or more attributes of the first circuit element to reduce defects in the first circuit element.

3. The method of claim 1, where extracting electrical sensitivity and/or functional sensitivity information comprises:
    assigning a first sensitivity value to each circuit element that is electrically robust; and
    assigning a second sensitivity value to each circuit element that is electrically sensitive, where the first sensitivity value is smaller than the second sensitivity value.

4. The method of claim 1, where extracting electrical sensitivity and/or functional sensitivity information comprises assigning an electrical sensitivity value to a first circuit element, where the electrical sensitivity value is a first timing slack value if a timing slack measure for the first circuit element is below a first threshold, and where the electrical sensitivity value is a second timing slack value if the timing slack measure for the first circuit element is above the first threshold.

5. The method of claim 1, where extracting electrical sensitivity and/or functional sensitivity information comprises assigning an electrical sensitivity value to a first circuit element, where the electrical sensitivity value is a first power sag value if a power sag measure for the first circuit element is above a first threshold, and where the electrical sensitivity value is a second power sag value if the power sag measure for the first circuit element is below the first threshold.

6. The method of claim 1, where extracting electrical sensitivity and/or functional sensitivity information comprises assigning a functional sensitivity value to a first circuit element, where the functional sensitivity value is a first criticality value if the first circuit element provides a critical function to the integrated circuit, and where the functional sensitivity value is a second criticality value if the first circuit element does not provide a critical function to the integrated circuit.

7. The method of claim 1, where extracting electrical sensitivity and/or functional sensitivity information comprises assigning a functional sensitivity value to a first circuit element, where the functional sensitivity value is a first redundancy value if the first circuit element provides a redundant function to the integrated circuit, and where the functional sensitivity value is a second redundancy value if the first circuit element does not provide a redundant function to the integrated circuit.

8. The method of claim 1, further comprising linking any extracted electrical sensitivity and/or functional sensitivity information for a first circuit element to the physical layout representation for the first circuit element.

9. The method of claim 1, where computing an adjusted POF value comprises decreasing the baseline POF value for a first circuit element by a first electrical sensitivity value if the first circuit element is electrically robust, but increasing the baseline POF value for the first circuit element by a second electrical sensitivity value if the first circuit element is not electrically robust.

10. The method of claim 1, further comprising verifying the layout information if the yield prediction satisfies a predetermined criterion.

11. The method of claim 10, further comprising fabricating an integrated circuit based on the layout information that has been verified.

12. A method for designing an integrated circuit, comprising:
receiving an integrated circuit design comprising an electrical circuit representation and a physical layout representation for at least one circuit element;
generating a baseline probability of fault (POF) value for the circuit element based on a physical dimension parameter of the circuit element;
applying one or more predetermined performance criteria to the electrical circuit representation of the circuit element to generate one or more circuit sensitivity values for the at least one circuit element;
adjusting the baseline POF value, by a computer, using one or more circuit sensitivity values for the circuit element to compute an adjusted POF value for the at least one circuit element;
linking the adjusted POF value to the physical layout representation for the at least one circuit element; and
determining a yield prediction for the integrated circuit based on the adjusted POF value for the at least one circuit element.

13. The method of claim 12, where applying one or more predetermined performance criteria comprises determining if the circuit element meets a timing slack threshold requirement.

14. The method of claim 12, where applying one or more predetermined performance criteria comprises determining if the circuit element meets a power sag threshold requirement.

15. The method of claim 12, where applying one or more predetermined performance criteria comprises determining if the circuit element provides a critical circuit function.

16. The method of claim 12, where linking the adjusted POF value to the physical layout representation for the at least one circuit element comprises maintaining a database in which each physical layout representation for each circuit element is uniquely identified and associated with the one or more circuit sensitivity values corresponding to the circuit element.

17. The method of claim 12, where linking the adjusted POF value to the physical layout representation for the at least one circuit element comprises tagging physical layout representation information for each circuit element with the one or more circuit sensitivity values corresponding to the circuit element.

18. The method of claim 12, further comprising:
identifying a first circuit element having an adjusted POF value that does not meet a predetermined yield test criteria; and
adjusting one or more attributes of the first circuit element to reduce defects in the first circuit element.

19. The method of claim 18, further comprising:
modifying the physical layout representation for at least one circuit element in response to adjusting one or more attributes of the first circuit element; and
fabricating an integrated circuit based on the modified physical layout representation that has been verified if the yield prediction satisfies a predetermined criterion.

20. The method of claim 12, further comprising verifying the physical layout representation for at least one circuit element if the yield prediction satisfies a predetermined criterion.

21. The method of claim 20, further comprising fabricating an integrated circuit based on the physical layout representation that has been verified.

22. A computer-usable medium embodying computer program code, the computer program code comprising computer executable instructions configured for determining a yield prediction for an integrated circuit by:
receiving circuit layout information for an integrated circuit formed with one or more circuit elements, where the circuit layout information comprises an electrical circuit representation and a physical layout representation for each circuit element;
extracting one or more circuit sensitivity values for each of the one or more circuit elements;
extracting a baseline probability of failure (POF) value from the physical layout representation for each of the one or more circuit elements;
computing an adjusted POF value for each of the one or more circuit elements by mathematically combining the one or more circuit sensitivity values for each of the one or more circuit elements with its corresponding baseline POF value; and
determining a yield prediction for the integrated circuit based on the adjusted POF values for each of the one or more circuit elements.

23. The computer-usable medium of claim 22, where the computer program code further comprises computer executable instructions configured for:
identifying a first circuit element having an adjusted POF value that does not meet a predetermined yield test criteria; and
adjusting one or more attributes of the first circuit element to reduce defects in the first circuit element.

24. The computer-usable medium of claim 22, where the computer program code further comprises computer executable instructions configured for extracting one or more circuit sensitivity values by:

assigning a first sensitivity value to each circuit element that is electrically robust; and assigning a second sensitivity value to each circuit element that is electrically sensitive, where the first sensitivity value is smaller than the second sensitivity value.

25. The computer-usable medium of claim 22, where the computer program code further comprises computer executable instructions configured for extracting one or more circuit sensitivity values by assigning an electrical sensitivity value to a first circuit element, where the electrical sensitivity value is a first timing slack value if a timing slack measure for the first circuit element is below a first threshold, and where the electrical sensitivity value is a second timing slack value if the timing slack measure for the first circuit element is above the first threshold.

* * * * *